United States Patent
Fan et al.

(10) Patent No.: US 11,236,918 B2
(45) Date of Patent: Feb. 1, 2022

(54) AIR CONDITIONER, AND OPERATION PARAMETER RECOMMENDATION METHOD, SYSTEM, AND BIG DATA SERVER FOR SAME

(71) Applicant: GD MIDEA AIR-CONDITIONING EQUIPMENT CO., LTD., Foshan (CN)

(72) Inventors: Qifeng Fan, Foshan (CN); Jiwei Hei, Foshan (CN)

(73) Assignee: GD MIDEA AIR-CONDITIONING EQUIPMENT CO., LTD., Foshan (CN)

(*) Notice: Subject to any disclaimer, the term of this patent is extended or adjusted under 35 U.S.C. 154(b) by 60 days.

(21) Appl. No.: 16/826,617

(22) Filed: Mar. 23, 2020

(65) Prior Publication Data

US 2020/0232666 A1    Jul. 23, 2020

Related U.S. Application Data

(63) Continuation of application No. PCT/CN2018/093147, filed on Jun. 27, 2018.

(30) Foreign Application Priority Data

Sep. 30, 2017    (CN) .......................... 201710915440.3

(51) Int. Cl.
*F24F 11/30* (2018.01)
*F24F 11/64* (2018.01)
(Continued)

(52) U.S. Cl.
CPC .............. *F24F 11/30* (2018.01); *F24F 11/62* (2018.01); *F24F 11/64* (2018.01); *G05B 19/042* (2013.01);
(Continued)

(58) Field of Classification Search
CPC ........ F24F 11/46; F24F 11/64; F24F 2120/20; F24F 11/65; F24F 2110/10;
(Continued)

(56) References Cited

U.S. PATENT DOCUMENTS

| 9,933,796 B2 * | 4/2018 | Song ........................ F24F 11/62 |
| 2004/0107717 A1 | 6/2004 | Yoon et al. |

(Continued)

FOREIGN PATENT DOCUMENTS

| CN | 104279700 A | 1/2015 |
| CN | 104864548 A | 8/2015 |

(Continued)

OTHER PUBLICATIONS

The State Intellectual Property Office of PRC (SIPO) The First Office Action For CN Application No. 201710915440.3 dated Mar. 5, 2019 9 Pages (Translation Included ).

(Continued)

*Primary Examiner* — Darrin D Dunn
(74) *Attorney, Agent, or Firm* — Anova Law Group PLLC

(57) ABSTRACT

An operation parameter recommending method includes acquiring current application scenario information of a target air conditioner, comparing the current application scenario information with an application scenario information database to select at least one matched application scenario which matches a current application scenario of the target air conditioner associated with the current application scenario information of the target air conditioner, acquiring an air conditioner operation parameter under each of the at least one matched application scenario, acquiring a group-behavior recommended parameter based on the acquired air conditioner operation parameter, acquiring historical operation records of the target air conditioner through an acquisition (Continued)

server, acquiring an individual-behavior recommended parameter based on the historical operation records, generating a final recommended parameter based on the group-behavior recommended parameter and the individual-behavior recommended parameter, and providing the final recommended parameter to control the target air conditioner to operate according to the final recommended parameter.

15 Claims, 2 Drawing Sheets

(51) Int. Cl.
| | |
|---|---|
| *G05B 19/042* | (2006.01) |
| *F24F 11/62* | (2018.01) |
| *F24F 140/60* | (2018.01) |
| *F24F 120/20* | (2018.01) |
| *F24F 140/50* | (2018.01) |
| *F24F 120/12* | (2018.01) |
| *F24F 120/14* | (2018.01) |

(52) U.S. Cl.
CPC ....... *F24F 2120/12* (2018.01); *F24F 2120/14* (2018.01); *F24F 2120/20* (2018.01); *F24F 2140/50* (2018.01); *F24F 2140/60* (2018.01); *G05B 2219/2614* (2013.01)

(58) Field of Classification Search
CPC ........ F24F 2120/10; F24F 11/30; F24F 11/62; F24F 2140/60; F24F 2140/50; F24F 2120/12; F24F 2120/14; G05B 19/042; G05B 2219/2614; G05B 15/02; G05B 2219/23227; G06F 16/90324; G06F 17/18
See application file for complete search history.

(56) References Cited

U.S. PATENT DOCUMENTS

| | | | |
|---|---|---|---|
| 2013/0226320 A1* | 8/2013 | Berg-Sonne | G05D 23/1902 700/90 |
| 2016/0320081 A1* | 11/2016 | Nikovski | G06N 20/00 |
| 2017/0245344 A1* | 8/2017 | Child | H05B 31/50 |
| 2017/0328595 A1* | 11/2017 | Iwasaki | F24F 11/46 |
| 2019/0196893 A1* | 6/2019 | Lee | G06F 11/0778 |
| 2020/0133218 A1* | 4/2020 | Boyd | F24F 11/52 |
| 2020/0355391 A1* | 11/2020 | Wenzel | F24F 11/65 |

FOREIGN PATENT DOCUMENTS

| | | |
|---|---|---|
| CN | 106322656 A | 1/2017 |
| CN | 106352475 A | 1/2017 |
| CN | 106369739 A | 2/2017 |
| CN | 106524429 A | 3/2017 |
| CN | 107204904 A | 9/2017 |
| CN | 107741084 A | 2/2018 |

OTHER PUBLICATIONS

World Intellectual Property Organization (WIPO) International Search Report for PCT/CN2018/093147 dated Aug. 22, 2018 6 Pages(Translation Included).

* cited by examiner

AIR CONDITIONER, AND OPERATION PARAMETER RECOMMENDATION METHOD, SYSTEM, AND BIG DATA SERVER FOR SAME

CROSS-REFERENCE TO RELATED APPLICATIONS

This application is a continuation of International Application No. PCT/CN2018/093147, filed Jun. 27, 2018, which claims priority to Chinese Application No. 201710915440.3, filed Sep. 30, 2017, the entire contents of both of which are incorporated herein by reference.

FIELD

The present disclosure relates to the field of air conditioner controlling techniques, and more particularly to an operation parameter recommending method for an air conditioner, an operation parameter recommending system for an air conditioner, an air conditioner and a big data server.

BACKGROUND

With the improvement of people's living standards, air conditioners have become necessary household appliances in people's lives. At present, an operation parameter of an air conditioner is generally set manually by the user, which is not convenient and intelligent.

SUMMARY

Embodiments of the present disclosure seek to solve at least one of the problems existing in the related art to at least some extent.

For this, a first objective of the present disclosure is to provide an operation parameter recommending method for an air conditioner, which can recommend a more appropriate operation parameter to the air conditioner, so as to achieve convenient and intelligent control of the air conditioner, thereby greatly improving the user experience.

A second objective of the present disclosure is to provide a non-transitory computer-readable storage medium.

A third objective of the present disclosure is to provide a computer program product.

A fourth objective of the present disclosure is to provide a big data server.

A fifth objective of the present disclosure is to provide an operation parameter recommending system for an air conditioner.

A sixth objective of the present disclosure is to provide an air conditioner.

In order to achieve the above objectives, embodiments of a first aspect of the present disclosure provide an operation parameter recommending method for an air conditioner, including: acquiring current application scenario information of a target air conditioner for which a recommended operation parameter is to be provided; comparing the current application scenario information with a stored application scenario information database to select from the application scenario information database at least one matched application scenario which matches a current application scenario of the target air conditioner; acquiring an operation parameter of an air conditioner under each matched application scenario, and acquiring a group-behavior recommended parameter based on the operation parameter of the air conditioner under each matched application scenario; acquiring historical operation records of the target air conditioner from an acquisition server, and acquiring an individual-behavior recommended parameter based on the historical operation records; and generating a final recommended parameter based on the group-behavior recommended parameter and the individual-behavior recommended parameter, and providing the final recommended parameter for the target air conditioner, such that the target air conditioner is controlled to operate according to the final recommended parameter.

With the operation parameter recommending method for an air conditioner according to embodiments of the present disclosure, the group-behavior recommended parameter is acquired by comparing the current user scenario of the target air conditioner with the application scenarios of other air conditioners of other users, the individual-behavior recommended parameter is acquired according to the historical operation records of the target air conditioner, then the final recommended parameter is generated based on the group-behavior recommended parameter and the individual-behavior recommended parameter, such that the target air conditioner is controlled to operate according to the final recommended parameter. In this way, both the group habits and a personal preference are considered, such that a more appropriate operation parameter can be recommended to the air conditioner to achieve the convenient and intelligent control of the air conditioner, thereby greatly improving the user experience.

In addition, the operation parameter recommending method according to above embodiments of the present disclosure further has the following additional technical features.

According to an embodiment of the present disclosure, application scenario information of an air conditioner includes a longitude and a latitude of a location of the air conditioner, sex and age of a user of the air conditioner, time of using the air conditioner, and an indoor temperature and an outdoor temperature when the air conditioner is used.

According to an embodiment of the present disclosure, the operation parameter recommending method further includes: calculating a distance from the current application scenario to an application scenario in the application scenario information database according to cosine similarity, and taking an application scenario at a distance from the current application scenario less than a preset distance as the matched application scenario, wherein a distance between an application scenario i and an application scenario j is calculated according to the following formula:

$$sim(S_i, S_j) = \cos(\vec{i}, \vec{j}) = \frac{\vec{i} * \vec{j}}{\|\vec{i}\| * \|\vec{j}\|},$$

where $S_i$ represents the application scenario i, $S_j$ represents the application scenario j, $sim(S_i, S_j)$ represents the distance between the application scenario i and the application scenario j, $\vec{i}$ represents an eigenvector of $S_i$, $\vec{j}$ represents an eigenvector of $S_j$, $\|\vec{i}\|$ represents a norm of the eigenvector $\vec{i}$, and $\|\vec{j}\|$ represents a norm of the eigenvector $\vec{j}$.

According to an embodiment of the present disclosure, the group-behavior recommended parameter is acquired according to a collaborative filtering recommendation algorithm, wherein the group-behavior recommended parameter is calculated in accordance with the following formula:

$$PG(S_p) = \overline{T}_p + \frac{\sum_{k=1}^{n} sim(S_p, S_k) * (T_{p,k} - \overline{T}_p)}{\sum_{k=1}^{n} sim(S_p, S_k)},$$

where PG($S_p$) represents the group-behavior recommended parameter, $S_p$ represents a matched application scenario p, $T_p$ represents an average operation parameter under the matched application scenario p, $T_{p, k}$ represents an operation parameter set at a $k^{th}$ time under the matched application scenario p, k being a positive integer, and n is a positive integer and represents a total number of times for setting an operation parameter under the matched application scenario p.

According to an embodiment of the present disclosure, the historical operation records include operation time, an operation parameter, an indoor temperature and an outdoor temperature at each operation of the target air conditioner.

According to an embodiment of the present disclosure, the individual-behavior recommended parameter is acquired according to a multiple linear regression model, wherein a training set is constructed by taking, from the historical operation records, the operation time, the indoor temperature and the outdoor temperature at each operation of the target air conditioner as independent variables and taking the operation parameter at each operation of the target air conditioner as a dependent variable; a multivariate linear model $$y = b_0 + \sum_{m=1}^{4} b_m * x$$

is trained according to the training set to obtain model parameter values $b_0 \sim b_4$; and a y value of the multivariate linear model is calculated based on current time, a current indoor temperature, a current outdoor temperature and the model parameter values $b_0 \sim b_4$ to obtain the individual-behavior recommended parameter.

According to an embodiment of the present disclosure, a weighted average of the group-behavior recommended parameter and the individual-behavior recommended parameter is calculated to obtain the final recommended parameter.

In order to achieve the above objectives, embodiments of a second aspect of the present disclosure provide a non-transitory computer-readable storage medium having stored therein computer programs that, when executed by a processor, cause an operation parameter recommending method for an air conditioner according to embodiments of the first aspect of the present disclosure to be implemented.

With the non-transitory computer-readable storage medium according to embodiments of the present disclosure, by implementing the operation parameter recommending method as described in embodiments of the first aspect of the present disclosure, a more appropriate operation parameter can be recommended to the air conditioner to achieve the convenient and intelligent control of the air conditioner, thereby greatly improving the user experience.

In order to achieve the above objectives, embodiments of a third aspect of the present disclosure provide a computer program product, having stored therein instructions that, when executed by a processor, cause an operation parameter recommending method for an air conditioner according to embodiments of the first aspect of the present disclosure to be performed.

The computer program product according to embodiments of the present disclosure, when executed by the processor, can recommend a more appropriate operation parameter to the air conditioner, such that the air conditioner can be controlled conveniently and intelligently, thereby greatly improving the user experience.

In order to achieve the above objectives, embodiments of a fourth aspect of the present disclosure provide a big data server, including: a memory; a processor; and computer programs stored in the memory and executable by the processor, wherein when the computer programs are executed by the processor, an operation parameter recommending method for an air conditioner according to embodiments of the first aspect of the present disclosure is implemented.

The big data server according to embodiments of the present disclosure can take both the group habits and a personal preference into consideration so as to recommend a more appropriate operation parameter to the air conditioner, such that the air conditioner can be controlled conveniently and intelligently, thereby greatly improving the user experience.

In order to achieve the above objectives, embodiments of a fifth aspect of the present disclosure provide an operation parameter recommending system for an air conditioner, including a target air conditioner for which a recommended operation parameter is to be provided, an acquisition server and a big data server, wherein the target air conditioner is configured to acquire operation data and upload the operation data to the acquisition server; the acquisition server is configured to generate historical operation records of the target air conditioner according to the operation data; and the big data server is configured to: communicate with the acquisition server to acquire the historical operation records of the target air conditioner, and acquire an individual-behavior recommended parameter according to the historical operation records, wherein the big data server is further configured to: acquire current application scenario information of the target air conditioner, compare the current application scenario information with a stored application scenario information database to select from the application scenario information database at least one matched application scenario which matches a current application scenario of the target air conditioner, acquire an operation parameter of an air conditioner under each matched application scenario, obtain a group-behavior recommended parameter according to the operation parameter of the air conditioner under each matched application scenario, generate a final recommended parameter according to the group-behavior recommended parameter and the individual-behavior recommended parameter, and provide the final recommended parameter for the target air conditioner; and the target air conditioner is further configured to operate according to the final recommended parameter.

With the operation parameter recommending system according to embodiments of the present disclosure, the big data server acquires the group-behavior recommended parameter by comparing the current user scenario of the target air conditioner with the application scenarios of other air conditioners of other users, and acquires the individual-behavior recommended parameter according to the historical operation records of the target air conditioner, and then generates the final recommended parameter based on the group-behavior recommended parameter and the individual-behavior recommended parameter, such that the target air conditioner is controlled to operate according to the final recommended parameter. In this way, both the group habits and a personal preference are considered, such that a more appropriate operation parameter can be recommended to the air conditioner to achieve the convenient and intelligent control of the air conditioner, thereby greatly improving the user experience.

In order to achieve the above objectives, embodiments of a sixth aspect of the present disclosure provide an air conditioner, including: a memory; a processor; and computer programs stored in the memory and executable by the processor, wherein when the computer programs are executed by the processor, a controlling method for an air conditioner is implemented, the method includes: acquiring operation data of the air conditioner; uploading the operation data to an acquisition server; receiving a final recommended parameter from a big data server; and controlling the air conditioner to operate according to the final recommended parameter, wherein the big data server is configured to: communicate with the acquisition server to acquire the operation data, acquire an individual-behavior recommended parameter according to the operation data, acquire a group-behavior recommended parameter, and generate the final recommended parameter based on the individual-behavior recommended parameter and the group-behavior recommended parameter.

The air conditioner according to embodiments of the present disclosure can receive a more appropriate operation parameter and operate conveniently and intelligently according to the more appropriate operation parameter, thereby greatly improving the user experience.

DETAILED DESCRIPTION

Figure 1:
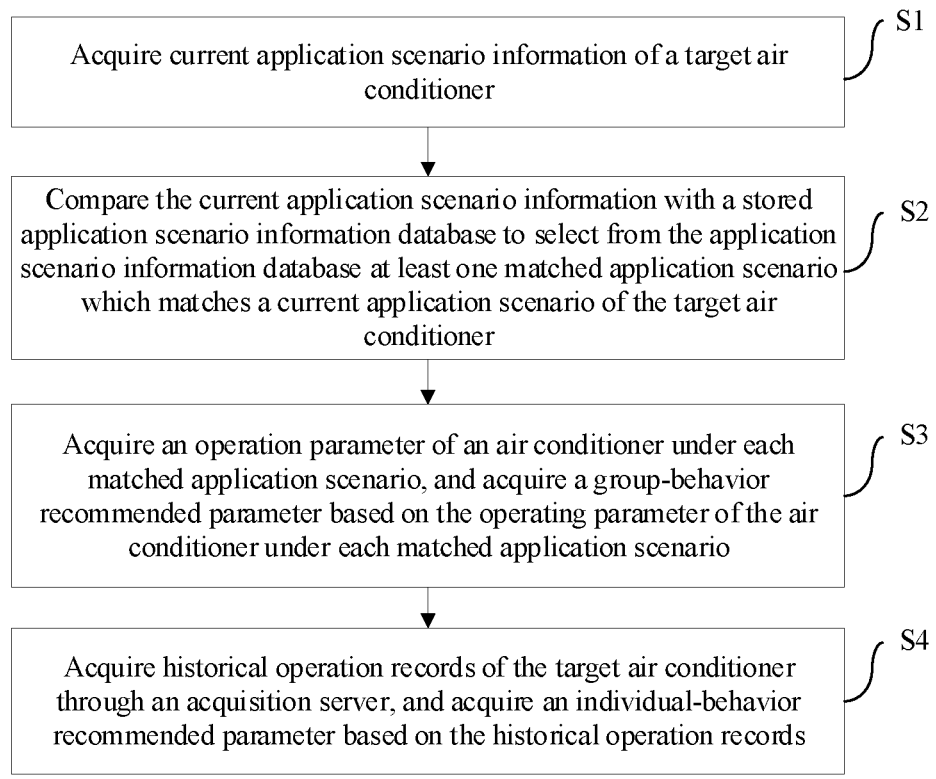
FIG. 1 is a flowchart of an operation parameter recommending method for an air conditioner according to some embodiments of the present disclosure.

Embodiments of the present disclosure will be described in detail below, examples of which are illustrated in the accompanying drawings. The same or similar elements and the elements having same or similar functions are denoted by same or similar reference numerals throughout the descriptions. The embodiments described herein with reference to drawings are explanatory, illustrative, and used to generally understand the present disclosure. The embodiments shall not be construed to limit the present disclosure.

In the following, an operation parameter recommending method for an air conditioner, an operation parameter recommending system for an air conditioner, an air conditioner having the operation parameter recommending system, and a big data server according to embodiments of the present disclosure will be described with reference to drawings.

FIG. 1 is a flowchart of an operation parameter recommending method for an air conditioner according to some embodiments of the present disclosure.

As shown in FIG. 1, the operation parameter recommending method for an air conditioner according to embodiments of the present disclosure includes the following steps.

At S1, current application scenario information of a target air conditioner for which a recommended operation parameter is to be provided is acquired.

It should be noted that, the operation parameter recommending method according to embodiments of the present disclosure may be performed in an operation parameter recommending system for an air conditioner. The operation parameter recommending system includes a plurality of air conditioners, and each of the plurality of air conditioners may be used as the target air conditioner. In some embodiments of the present disclosure, the target air conditioner can be an air conditioner whose operation parameter needs to be set currently. This air conditioner can receive a recommended operation parameter, and operate in accordance with the recommended operation parameter.

In an embodiment of the present disclosure, the operation parameter of the air conditioner may be a set temperature of the air conditioner.

It will be understood that the target air conditioner is used under a corresponding application scenario. For example, the target air conditioner is used by a certain user at a certain place, a certain time and a certain environment. In an embodiment of the present disclosure, application scenario information of an air conditioner may include a longitude and a latitude of a location of the air conditioner, sex of a user of the air conditioner, time of using the air conditioner, and an indoor temperature and an outdoor temperature when the air conditioner is used. It should be noted that, the longitude and the latitude, if not specified with their orientations in a specific embodiment, will refer to an east longitude and a north latitude by default.

The current application scenario information of the target air conditioner includes a longitude (such as 113.1 degrees) and a latitude (such as 23.5 degrees) of a current location of the target air conditioner, sex (such as male, denoted by number 1) and age (such as 26) of a user of the target air conditioner, time (including the month and the time in a 24-hour format, such as at twelve o'clock (12) in August (8)) of using the target air conditioner, and an indoor temperature (such as 28° C.) and an outdoor temperature (such as 30° C.) when the target air conditioner is used. The specific current application scenario information described above as an example may be expressed as <113.1, 23.5, male, 26, 8, 12, 28, 30> in an embodiment of the present disclosure.

At S2, the current application scenario information is compared with a stored application scenario information database to select from the application scenario information database at least one matched application scenario which matches a current application scenario of the target air conditioner.

The application scenario information database may store the application scenario information of a plurality of air conditioners under a plurality of application scenarios. In order to improve the matching success rate and the recommendation accuracy of the operation parameter, the number of the air conditioners and the number of the application scenarios in embodiments of the present disclosure are as much as possible. For example, the application scenario information database may include the application scenario information of all the air conditioners in a city under all the application scenarios in a year.

Table 1 shows the application scenario information under N application scenarios included in an application scenario information database:

TABLE 1

| Feature\scenario | Longitude | Latitude | Sex | Age | Month | Time | Indoor temperature | Outdoor temperature |
|---|---|---|---|---|---|---|---|---|
| Scenario 1 | 113.3 | 22.5 | Male (1) | 25 | 7 | 12 | 28 | 30 |
| Scenario 2 | 105.0 | 31.1 | Male (1) | 30 | 1 | 13 | 10 | 7 |
| ... | ... | ... | ... | ... | ... | ... | ... | ... |
| Scenario N | 116.5 | 39.7 | Female (0) | 32 | 8 | 20 | 26 | 29 |

In an embodiment of the present disclosure, a distance from the current application scenario to an application scenario in the application scenario information database is calculated according to cosine similarity, and an application scenario at a distance from the current application scenario less than a preset distance is taken as the matched application scenario.

Specifically, a distance between an application scenario i and an application scenario j may be calculated according to the following formula:

$$sim(S_i, S_j) = \cos(\vec{i}, \vec{j}) = \frac{\vec{i} * \vec{j}}{\|\vec{i}\| * \|\vec{j}\|},$$

where $S_i$ represents the application scenario i, $S_j$ represents the application scenario j, sim ($S_i$, $S_j$) represents the distance between the application scenario i and the application scenario j, $\vec{i}$ represents an eigenvector of $S_i$, $\vec{j}$ represents an eigenvector of $S_j$, $\|\vec{i}\|$ represents a norm of the eigenvector $\vec{i}$, and $\|\vec{j}\|$ represents a norm of the eigenvector $\vec{j}$.

At S3, an operation parameter of an air conditioner under each matched application scenario is acquired, and a group-behavior recommended parameter is acquired based on the operation parameter of the air conditioner under each matched application scenario.

In an embodiment of the present disclosure, the group-behavior recommended parameter may be acquired according to a collaborative filtering recommendation algorithm. Specifically, the group-behavior recommended parameter may be calculated in accordance with the following formula:

$$PG(S_p) = \overline{T}_p + \frac{\sum_{k=1}^{n} sim(S_p, S_k) * (T_{p,k} - \overline{T}_p)}{\sum_{k=1}^{n} sim(S_p, S_k)},$$

where PG($S_p$) represents the group-behavior recommended parameter, $S_p$ represents a matched application scenario p, $\overline{T}_p$ represents an average operation parameter under the matched application scenario p, $T_{p,k}$ represents an operation parameter set at a $k^{th}$ time under the matched application scenario p, and n represents a total number of times for setting an operation parameter under the matched application scenario p.

At S4, historical operation records of the target air conditioner are acquired through an acquisition server, and an individual-behavior recommended parameter is acquired based on the historical operation records.

In an embodiment of the present disclosure, the target air conditioner may acquire operation data at each operation of the target air conditioner, and upload the operation data to the acquisition server through wireless network, such as WIFI (Wireless Fidelity). Therefore, the acquisition server may store the operation data received each time and generate the historical operation records of the target air conditioner.

The historical operation records may include operation time, an operation parameter, an indoor temperature and an outdoor temperature at each operation of the target air conditioner.

In an embodiment of the present disclosure, the individual-behavior recommended parameter may be acquired according to a multiple linear regression model.

Specifically, a training set is constructed firstly by taking, from the historical operation records, the operation time, the indoor temperature and the outdoor temperature at each operation of the target air conditioner as independent variables and taking the operation parameter at each operation of the target air conditioner as a dependent variable. For example, the month (month) of the operation, the time point (hour) of the operation, the indoor temperature (tempIn) and the outdoor temperature (tempOut) are taken as the independent variables, and the operation parameter (set) is taken as the dependent variable, that is $x_q$=<$month_q$, $hour_q$, $tempIn_q$, $tempOut_q$>, and $y_q$=$set_q$. In this way, a training set $\{(x_1, y_1), (x_2, y_2), \ldots, (x_Q, y_Q)\}$ is constructed, where Q represents the effective number of the operation data in the historical operation records. When the operation parameter is the set temperature, $y_i$ may be limited to a range of 17 to 30° C.

Then, a multivariate linear model $$y = b_0 + \sum_{m=1}^{4} b_m * x$$

may be trained according to the above training set to obtain model parameter values $b_0$~$b_4$, which may be specifically obtained by a gradient descent method.

Finally, a y value of the multivariate linear model may be calculated based on current time, a current indoor temperature, a current outdoor temperature and the model parameter values $b_0$~$b_4$ to obtain the individual-behavior recommended parameter, that is PS(X)=y(x=X), where X represents the current time, the current indoor temperature and the current outdoor temperature, and PS(X) represents the individual-behavior recommended parameter at the current time, the current indoor temperature and the current outdoor temperature.

At S5, a final recommended parameter is generated based on the group-behavior recommended parameter and the individual-behavior recommended parameter, and the final recommended parameter is provided to the target air conditioner, such that the target air conditioner is controlled to operate according to the final recommended parameter.

Specifically, a weighted average of the group-behavior recommended parameter and the individual-behavior recommended parameter may be calculated to obtain the final recommended parameter, that is, P=$w_1$*PG($S_p$)+$w_2$*PS(X), where P represents the final recommended parameter, $w_1$ represents a weight of the group-behavior recommended parameter, $w_2$ represents a weight of the individual-behavior recommended parameter, and $w_1+w_2=1$. It will be appreciated that specific values of $w_1$ and $w_2$ can be set according to the actual control requirements of the air conditioner.

The target air conditioner can receive the final recommended parameter, and execute the final recommended parameter, such as execute the final recommended set temperature.

In a specific embodiment of the present disclosure, the current application scenario information of the target air conditioner is <113.1, 23.5, male, 26, 8, 12, 28, 30>, and assuming that the application scenario information under the matched application scenarios selected from the application scenario information database are <113.3, 22.5, male, 25, 7, 12, 28, 30>, <105.0, 31.1, male, 30, 1, 13, 10, 7>, <116.5, 39.7, female, 32, 8, 20, 26, 29> and <113.0, 23.6, female, 24, 7, 13, 27, 29>, and the set temperatures of the air conditioners under these application scenarios are 26° C., 20° C., 25° C. and 26° C., respectively, then according to the above described collaborative filtering recommendation algorithm, a group-behavior recommended set temperature may be calculated to be 24.9° C. Assuming that the historical operation records of the target air conditioner in the past year are as follows: <7, 12, 28, 30>, set temperature of 26° C.; <7, 13, 27, 30>, set temperature of 26° C.; <1, 20, 15, 12>, set temperature of 20° C.; and <8, 20, 26, 29>, set temperature of 25° C., then an individual-behavior recommended set temperature calculated according to the above multiple linear regression model is 24° C. Assuming that the weight of the group-behavior recommended set temperature and that of the individual-behavior recommended set temperature are each 0.5, then a final recommended set temperature is 24.5° C. The final recommended set temperature is provided to the target air conditioner, such that the set temperature of the set temperature may be set to be 24.5° C.

In summary, with the operation parameter recommending method according to embodiments of the present disclosure, the group-behavior recommended parameter is acquired by comparing the current user scenario of the target air conditioner with the application scenarios of other air conditioners of other users, the individual-behavior recommended parameter is acquired according to the historical operation records of the target air conditioner, and then the final recommended parameter is generated based on the group-behavior recommended parameter and the individual-behavior recommended parameter, such that the target air conditioner is controlled to operate according to the final recommended parameter. In this way, both the group habits and a personal preference are considered, such that a more appropriate operation parameter can be recommended to the air conditioner to achieve the convenient and intelligent control of the air conditioner, thereby greatly improving the user experience.

Corresponding to the above embodiments, the present disclosure further provides a non-transitory computer-readable storage medium.

The non-transitory computer-readable storage medium according to embodiments of the present disclosure has stored therein computer programs that, when executed by a processor, cause the operation parameter recommending method for an air conditioner as described in the embodiments hereinbefore to be implemented.

With the non-transitory computer-readable storage medium according to embodiments of the present disclosure, by implementing the operation parameter recommending method as described in embodiments hereinbefore, a more appropriate operation parameter can be recommended to the air conditioner to achieve the convenient and intelligent control of the air conditioner, thereby greatly improving the user experience.

Corresponding to the above embodiments, the present disclosure further provides a computer program product.

The computer program product according to embodiments of the present disclosure has stored therein instructions that, when executed by a processor, cause the operation parameter recommending method for an air conditioner as described in the embodiments hereinbefore to be implemented.

The computer program product according to embodiments of the present disclosure, when executed by the processor, can recommend a more appropriate operation parameter to the air conditioner, such that the air conditioner can be controlled conveniently and intelligently, thereby greatly improving the user experience.

Corresponding to the above embodiments, the present disclosure further provides an operation parameter recommending system for an air conditioner.

Figure 2:
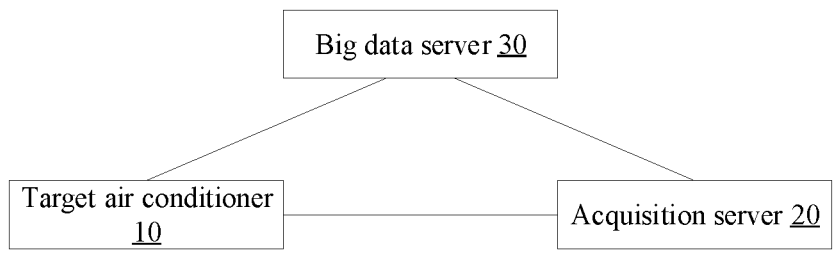
FIG. 2 is a block diagram of an operation parameter recommending system for an air conditioner according to some embodiments of the present disclosure.

As shown in FIG. 2, the operation parameter recommending system for an air conditioner according to embodiments of the present disclosure includes a target air conditioner 10 for which a recommended operation parameter is to be provided, an acquisition server 20 and a big data server 30.

The target air conditioner 10 is configured to acquire operation data and upload the operation data to the acquisition server 20. The acquisition server 20 is configured to generate historical operation records of the target air conditioner 10 according to the operation data. The big data server 30 is configured to communicate with the acquisition server 20 to acquire the historical operation records of the target air conditioner 10, and acquire an individual-behavior recommended parameter according to the historical operation records. The big data server 30 is further configured to: acquire current application scenario information of the target air conditioner 10, compare the current application scenario information with a stored application scenario information database to select from the application scenario information database at least one matched application scenario which matches a current application scenario of the target air conditioner 10, acquire an operation parameter of an air conditioner under each matched application scenario, obtain a group-behavior recommended parameter according to the operation parameter of the air conditioner under each matched application scenario, generate a final recommended parameter according to the group-behavior recommended parameter and the individual-behavior recommended parameter, and provide the final recommended parameter for the target air conditioner 10. The target air conditioner 10 is further configured to operate according to the final recommended parameter.

It should be noted that, the operation parameter recommending system may include a plurality of air conditioners, and each of the plurality of air conditioners may be used as the target air conditioner. In some embodiments of the present disclosure, the target air conditioner can be an air conditioner whose operation parameter needs to be set currently. This air conditioner can receive a recommended operation parameter, and operate in accordance with the recommended operation parameter.

For the specific embodiments of the operation parameter recommending system, reference can be made to those described hereinbefore, and will not be elaborated here.

With the operation parameter recommending system according to embodiments of the present disclosure, the big data server acquires the group-behavior recommended parameter by comparing the current user scenario of the target air conditioner with the application scenarios of other air conditioners of other users, and acquires the individual-behavior recommended parameter according to the historical operation records of the target air conditioner, and then generates the final recommended parameter based on the group-behavior recommended parameter and the individual-behavior recommended parameter, such that the target air conditioner is controlled to operate according to the final recommended parameter. In this way, both the group habits and a personal preference are considered, such that a more appropriate operation parameter can be recommended to the air conditioner to achieve the convenient and intelligent control of the air conditioner, thereby greatly improving the user experience.

Corresponding to the above embodiments, the present disclosure further provides an air conditioner.

The air conditioner according to embodiments of the present disclosure includes a memory; a processor; and computer programs stored in the memory and executable by the processor. When the computer programs are executed by the processor, a controlling method for an air conditioner is implemented. The controlling method includes: acquiring operation data of the air conditioner; uploading the operation data to an acquisition server; receiving a final recommended parameter from a big data server; and controlling the air conditioner to operate according to the final recommended parameter. The big data server is configured to communicate with the acquisition server to acquire the operation data, acquire an individual-behavior recommended parameter according to the operation data, acquire a group-behavior recommended parameter, and generate the final recommended parameter based on the individual-behavior recommended parameter and the group-behavior recommended parameter.

That is, the air conditioner as described in these embodiments is the target air conditioner as described in the embodiments hereinbefore, and for the more specific embodiments of the air conditioner, reference can be made to the embodiments described hereinbefore.

The air conditioner according to embodiments of the present disclosure can receive a more appropriate operation parameter and operate conveniently and intelligently according to the more appropriate operation parameter, thereby greatly improving the user experience.

Corresponding to the above embodiments, the present disclosure further provides a big data server.

The big data server according to embodiments of the present disclosure includes a memory; a processor; and computer programs stored in the memory and executable by the processor. When the computer programs are executed by the processor, the operation parameter recommending method for an air conditioner as described in embodiments hereinbefore is implemented.

The big data server according to embodiments of the present disclosure can take both the group habits and a personal preference into consideration so as to recommend a more appropriate operation parameter to the air conditioner, such that the air conditioner can be controlled conveniently and intelligently, thereby greatly improving the user experience.

Corresponding to the above embodiments, the present disclosure further provides another big data server.

Figure 3:
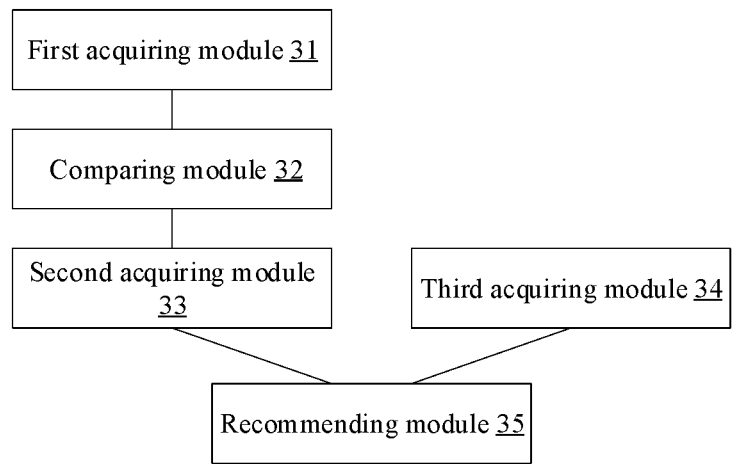
FIG. 3 is a block diagram of a big data server according to some embodiments of the present disclosure.

As shown in FIG. 3, the big data server according to embodiments of the present disclosure includes a first acquiring module 31, a comparing module 32, a second acquiring module 33, a third acquiring module 34 and a recommending module 35.

The first acquiring module 31 is configured to current application scenario information of a target air conditioner for which a recommended operation parameter is to be provided. The comparing module 32 is configured to compare the current application scenario information with a stored application scenario information database to select from the application scenario information database at least one matched application scenario which matches a current application scenario of the target air conditioner. The second acquiring module 33 is configured to acquire an operation parameter of an air conditioner under each matched application scenario, and acquire a group-behavior recommended parameter based on the operation parameter of the air conditioner under each matched application scenario. The third acquiring module 34 is configured to acquire historical operation records of the target air conditioner from an acquisition server, and acquire an individual-behavior recommended parameter based on the historical operation records. The recommending module 35 is configured to generate a final recommended parameter based on the group-behavior recommended parameter and the individual-behavior recommended parameter, and provide the final recommended parameter for the target air conditioner, such that the target air conditioner is controlled to operate according to the final recommended parameter.

It should be noted that, the big data server according to embodiments of the present disclosure may be connected to a plurality of air conditioner, and each of the plurality of air conditioners may be used as the target air conditioner. In some embodiments of the present disclosure, the target air conditioner can be an air conditioner whose operation parameter needs to be set currently. This air conditioner can receive a recommended operation parameter, and operate in accordance with the recommended operation parameter.

In an embodiment of the present disclosure, the operation parameter of the air conditioner may be a set temperature of the air conditioner.

It will be understood that the target air conditioner is used under a corresponding application scenario. For example, the target air conditioner is used by a certain user at a certain place, a certain time and a certain environment. In an embodiment of the present disclosure, application scenario information of an air conditioner may include a longitude and a latitude of a location of the air conditioner, sex of a user of the air conditioner, time of using the air conditioner, and an indoor temperature and an outdoor temperature when the air conditioner is used. It should be noted that, the longitude and the latitude, if not specified with their orientations in a specific embodiment, will refer to an east longitude and a north latitude by default.

The current application scenario information of the target air conditioner includes a longitude (such as 113.1 degrees) and a latitude (such as 23.5 degrees) of a current location of the target air conditioner, sex (such as male, denoted by number 1) and age (such as 26) of a user of the target air conditioner, time (including the month and the time in a 24-hour format, such as at twelve o'clock (12) in August (8)) of using the target air conditioner, and an indoor temperature (such as 28° C.) and an outdoor temperature (such as 30° C.) when the target air conditioner is used. The specific current application scenario information described above as an example may be expressed as <113.1, 23.5, male, 26, 8, 12, 28, 30> in an embodiment of the present disclosure.

The application scenario information database is stored in the big data server and may store the application scenario information of a plurality of air conditioners under a plurality of application scenarios. In order to improve the matching success rate and the recommendation accuracy of the operation parameter, the number of the air conditioners and the number of the application scenarios in embodiments of the present disclosure are as much as possible. For example, the application scenario information database may include the application scenario information of all the air conditioners in a city under all the application scenarios in a year.

The application scenario information under N application scenarios included in an example application scenario information database is shown in Table 1 above.

In an embodiment of the present disclosure, the comparing module 32 may calculate a distance from the current application scenario to an application scenario in the application scenario information database according to cosine similarity, and take an application scenario at a distance from the current application scenario less than a preset distance as the matched application scenario.

Specifically, the comparing module 32 may calculate a distance between an application scenario i and an application scenario j according to the following formula:

$$sim(S_i, S_j) = \cos(\vec{i}, \vec{j}) = \frac{\vec{i} * \vec{j}}{\|\vec{i}\| * \|\vec{j}\|},$$

where $S_i$ represents the application scenario i, $S_j$ represents the application scenario j, sim $(S_i, S_j)$ represents the distance between the application scenario i and the application scenario j, $\vec{i}$ represents an eigenvector of $S_i$, $\vec{j}$ represents an eigenvector of $S_j$, $\|\vec{i}\|$ represents a norm of the eigenvector $\vec{i}$, and $\|\vec{j}\|$ represents a norm of the eigenvector $\vec{j}$.

In an embodiment of the present disclosure, the second acquiring module 33 may acquire the group-behavior recommended parameter according to a collaborative filtering recommendation algorithm. Specifically, the second acquiring module 33 may calculate the group-behavior recommended parameter in accordance with the following formula:

$$PG(S_p) = \overline{T}_p + \frac{\sum_{k=1}^{n} sim(S_p, S_k) * (T_{p,k} - \overline{T}_p)}{\sum_{k=1}^{n} sim(S_p, S_k)},$$

where $PG(S_p)$ represents the group-behavior recommended parameter, $S_p$ represents a matched application scenario p, $\overline{T}_p$ represents an average operation parameter under the matched application scenario p, $T_{p,k}$ represents an operation parameter set at a $k^{th}$ time under the matched application scenario p, and n represents a total number of times for setting an operation parameter under the matched application scenario p.

In an embodiment of the present disclosure, the target air conditioner may acquire operation data at each operation of the target air conditioner, and upload the operation data to the acquisition server through wireless network, such as WIFI. Therefore, the acquisition server may store the operation data received each time and generate the historical operation records of the target air conditioner.

The historical operation records may include operation time, an operation parameter, an indoor temperature and an outdoor temperature at each operation of the target air conditioner.

In an embodiment of the present disclosure, the third acquiring module 34 may acquire the individual-behavior recommended parameter according to a multiple linear regression model.

Specifically, firstly, the third acquiring module 34 may take, from the historical operation records, the operation time, the indoor temperature and the outdoor temperature at each operation of the target air conditioner as independent variables and take the operation parameter at each operation of the target air conditioner as a dependent variable to construct a training set. For example, the month (month) of the operation, the time point (hour) of the operation, the indoor temperature (tempIn) and the outdoor temperature (tempOut) are taken as the independent variables, and the operation parameter (set) is taken as the dependent variable, that is $x_q$=<$month_q$, $hour_q$, $tempIn_q$, $tempOut_q$>, and $y_q$=$set_q$. In this way, a training set $\{(x_1, y_1), (x_2, y_2), \ldots, (x_Q, y_Q)\}$ is constructed, where Q represents the effective number of the operation data in the historical operation records. When the operation parameter is the set temperature, $y_i$ may be limited to a range of 17 to 30° C.

Then, the third acquiring module 34 may train a multivariate linear model $$y = b_0 + \sum_{m=1}^{4} b_m * x$$

according to the above training set to obtain model parameter values $b_0$~$b_4$, which may be specifically obtained by a gradient descent method.

Finally, the third acquiring module 34 may calculate a y value of the multivariate linear model based on current time, a current indoor temperature, a current outdoor temperature and the model parameter values $b_0$~$b_4$ to obtain the individual-behavior recommended parameter, that is PS(X)=y (x=X), where X represents the current time, the current indoor temperature and the current outdoor temperature, and PS(X) represents the individual-behavior recommended parameter at the current time, the current indoor temperature and the current outdoor temperature.

In an embodiment of the present disclosure, the recommending module 35 may calculate a weighted average of the group-behavior recommended parameter and the individual-behavior recommended parameter to obtain the final recommended parameter, that is, P=$w_1$*PG($S_p$)+$w_2$*PS(X), where P represents the final recommended parameter, $w_1$ represents a weight of the group-behavior recommended parameter, $w_2$ represents a weight of the individual-behavior recommended parameter, and $w_1$+$w_2$=1. It will be appreciated that specific values of $w_1$ and $w_2$ can be set according to the actual control requirements of the air conditioner.

The target air conditioner can receive the final recommended parameter, and execute the final recommended parameter, such as execute the final recommended set temperature.

In summary, with the big data server according to embodiments of the present disclosure, the group-behavior recommended parameter is acquired by comparing the current user scenario of the target air conditioner with the application scenarios of other air conditioners of other users, and the individual-behavior recommended parameter is acquired according to the historical operation records of the target air conditioner, and then the final recommended parameter is generated based on the group-behavior recommended parameter and the individual-behavior recommended parameter, such that the target air conditioner is controlled to operate according to the final recommended parameter. In this way, both the group habits and a personal preference are considered, such that a more appropriate operation parameter can be recommended to the air conditioner to achieve the convenient and intelligent control of the air conditioner, thereby greatly improving the user experience.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial," and "circumferential" should be construed to refer to the orientation or position relation as then described or as shown in the drawings under discussion. These relative terms are for convenience and simplification of description and do not indicate or imply that the devices or elements referred to must have a particular orientation, be constructed or operated in a particular orientation, and thus cannot be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may explicitly or implicitly includes one or more of this feature. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications or interactions of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "one embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in an embodiment," "in one embodiment," "in some embodiments," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, without contradiction, different embodiments or examples as well as features of different embodiments or examples described in the specification can be combined by those skilled in the art.

Although embodiments of the present disclosure have been shown and described above, it would be appreciated by those skilled in the art that the above embodiments are exemplary and cannot be construed to limit the present disclosure, and changes, alternatives, variants and modifications can be made in the embodiments within the scope of the present disclosure.

What is claimed is:

1. A method comprising:
   acquiring current application scenario information of a target air conditioner, the current application scenario information being associated with a current application scenario of the target air conditioner;
   comparing the current application scenario information with an application scenario information database to select, from the application scenario information database, at least one matched application scenario which matches the current application scenario of the target air conditioner;
   acquiring an air conditioner operation parameter under each of the at least one matched application scenario;
   acquiring a group-behavior recommended parameter based on the acquired air conditioner operation parameter;
   acquiring historical operation records of the target air conditioner through an acquisition server;
   acquiring an individual-behavior recommended parameter based on the historical operation records;
   generating a final recommended parameter based on the group-behavior recommended parameter and the individual-behavior recommended parameter; and
   controlling the target air conditioner to operate according to the final recommended parameter;
   wherein application scenario information of an air conditioner includes two or more of a longitude and a latitude of a location of the air conditioner, sex and age of a user of the air conditioner, and an indoor temperature and an outdoor temperature when the air conditioner is used.

2. The method according to claim 1, wherein the application scenario information further includes time of using the air conditioner.

3. The method according to claim 1, wherein comparing the current application scenario information with the application scenario information database to select the at least one matched application scenario includes:
   calculating a distance from the current application scenario to a candidate application scenario in the application scenario information database according to cosine similarity; and
   determining the candidate application scenario as one of the at least one matched application scenario in response to the distance from the current application scenario to the candidate application scenario being less than a preset distance.

4. The method according to claim 3, wherein the distance between the current application scenario and the candidate application scenario is calculated according to:

$$sim(S_i, S_j) = \cos(\vec{i}, \vec{j}) = \frac{\vec{i} * \vec{j}}{\|\vec{i}\| * \|\vec{j}\|},$$

where $S_i$ represents the current application scenario, $S_j$ represents the candidate application scenario, sim $(S_i, S_j)$ represents the distance between the current application scenario and the candidate application scenario, $\vec{i}$ represents an eigenvector of $S_i$, $\vec{j}$ represents an eigenvector of $S_j$, $\|\vec{i}\|$ represents a norm of the eigenvector $\vec{i}$, and $\|\vec{j}\|$ represents a norm of the eigenvector $\vec{j}$.

5. The method according to claim 1, wherein the group-behavior recommended parameter is acquired according to a collaborative filtering recommendation algorithm.

6. The method according to claim 5, wherein the group-behavior recommended parameter is calculated according to:

$$PG(S_p) = \overline{T}_p + \frac{\sum_{k=1}^{n} sim(S_p, S_k) * (T_{p,k} - \overline{T}_p)}{\sum_{k=1}^{n} sim(S_p, S_k)},$$

where $PG(S_p)$ represents the group-behavior recommended parameter, $S_p$ represents a matched application scenario p of the at least one matched application scenario, $\overline{T}_p$ represents an average operation parameter under the matched application scenario p, $T_{p,k}$ represents an operation parameter set at a $k^{th}$ time under the matched application scenario p, and n represents a total number of times for setting an operation parameter under the matched application scenario p.

7. The method according to claim 1, wherein the historical operation records comprise at least one of an operation time, an operation parameter, or an indoor temperature and an outdoor temperature at each operation of the target air conditioner.

8. The method according to claim 7, wherein the individual-behavior recommended parameter is acquired according to a multiple linear regression model.

9. The method according to claim 8, wherein the individual-behavior recommended parameter is acquired by:
constructing a training set with the operation time, the indoor temperature and the outdoor temperature at each operation of the target air conditioner from the historical operation records being independent variables and the operation parameter at each operation of the target air conditioner being a dependent variable;
training a multivariate linear model $$y = b_0 + \sum_{m=1}^{4} b_m * x$$

according to the training set to obtain model parameter values $b_0 \sim b_4$, x denoting the independent variables in the multivariate linear model and y denoting the dependent variable in the multivariate linear model; and
substituting a current time, a current indoor temperature, a current outdoor temperature, and the model parameter values $b_0 \sim b_4$ into the multivariate linear model to calculate ay value as the individual-behavior recommended parameter.

10. The method according to claim 1, wherein generating the final recommended parameter includes calculating a weighted average of the group-behavior recommended parameter and the individual-behavior recommended parameter as the final recommended parameter.

11. A non-transitory computer-readable storage medium storing computer programs that, when executed by a processor, cause the processor to execute the method according to claim 1.

12. A server comprising:
a processor; and
a memory storing computer programs that, when executed by the processor, cause the processor to execute the operation parameter recommending method according to claim 1.

13. The method according to claim 1, wherein the group-behavior recommended parameter is calculated according to two or more of:
one matched application scenario of the at least one matched application scenario,
an average operation parameter under the one matched application scenario,
an operation parameter once set under the one matched application scenario, and
a total number of times for setting an operation parameter under the one matched application scenario.

14. A system comprising:
a target air conditioner configured to acquire operation data;
an acquisition server including:
a first memory storing first instructions; and
a first processor configured to execute the first instructions to:
communicate with the target air conditioner to receive the operation data uploaded by the target air conditioner; and
generate historical operation records of the target air conditioner according to the operation data; and
a data server including:
a second memory storing second instructions; and
a second processor configured to execute the second instructions to:
communicate with the acquisition server to acquire the historical operation records of the target air conditioner;
acquire an individual-behavior recommended parameter according to the historical operation records;
acquire current application scenario information of the target air conditioner, the current application scenario information being associated with a current application scenario of the target air conditioner;
compare the current application scenario information with an application scenario information database to select, from the application scenario information database, at least one matched application scenario which matches the current application scenario of the target air conditioner;

acquire an air conditioner operation parameter under each of the at least one matched application scenario;

obtain a group-behavior recommended parameter according to the acquired air conditioner operation parameter;

generate a final recommended parameter according to the group-behavior recommended parameter and the individual-behavior recommended parameter; and provide the final recommended parameter to the target air conditioner;

wherein:

the target air conditioner includes a third processor configured to control the target air conditioner to operate according to the final recommended parameter; and application scenario information of an air conditioner includes two or more of a longitude and a latitude of a location of the air conditioner, sex and age of a user of the air conditioner, and an indoor temperature and an outdoor temperature when the air conditioner is used.

15. An air conditioner comprising:

a processor; and a memory storing computer programs that, when executed by the processor, cause the processor to:

acquire operation data of the air conditioner;

upload the operation data to an acquisition server;

receive a final recommended parameter from a data server; and control the air conditioner to operate according to the final recommended parameter;

wherein:

the final recommended parameter is generated based on a group-behavior recommended parameter and an individual-behavior recommended parameter;

the group-behavior recommended parameter is obtained based on an air conditioner operation parameter under each of at least one matched application scenario that matches a current application scenario of the air conditioner;

the individual-behavior recommended parameter is obtained based on the operation data of the air conditioner acquired from the acquisition server; and application scenario information of an air conditioner includes two or more of a longitude and a latitude of a location of the air conditioner, sex and age of a user of the air conditioner, and an indoor temperature and an outdoor temperature when the air conditioner is used.

* * * * *